(12) United States Patent
Yellepeddy et al.

(10) Patent No.: US 7,107,297 B2
(45) Date of Patent: Sep. 12, 2006

(54) SYSTEM AND METHOD FOR METADIRECTORY DIFFERENTIAL UPDATES AMONG CONSTITUENT HETEROGENEOUS DATA SOURCES

(75) Inventors: Krishna Kishore Yellepeddy, Austin, TX (US); Rod Mancisidor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 10/044,998

(22) Filed: Jan. 10, 2002

(65) Prior Publication Data

US 2003/0145003 A1   Jul. 31, 2003

(51) Int. Cl.
*G06F 17/30* (2006.01)
(52) U.S. Cl. .............. 707/204; 707/104.1; 707/100
(58) Field of Classification Search ............... 707/3, 707/6, 202, 204
See application file for complete search history.

(56) References Cited

U.S. PATENT DOCUMENTS

| | | | |
|---|---|---|---|
| 5,276,874 A | | 1/1994 | Thomson ................ 707/102 |
| 5,630,116 A | | 5/1997 | Takaya et al. ............ 395/617 |
| 5,838,923 A | | 11/1998 | Lee et al. ................ 395/200 |
| 5,860,078 A | | 1/1999 | Emmot .................... 711/3 |
| 6,052,799 A | | 4/2000 | Li et al. .................. 714/13 |
| 6,078,952 A | | 6/2000 | Fielding et al. .......... 709/221 |
| 6,167,445 A | * | 12/2000 | Gai et al. ................ 709/223 |
| 6,253,202 B1 | * | 6/2001 | Gilmour .................... 707/9 |
| 6,377,950 B1 | * | 4/2002 | Peters et al. ............. 707/10 |
| 6,615,223 B1 | * | 9/2003 | Shih et al. ................ 707/201 |
| 2002/0038308 A1 | * | 3/2002 | Cappi ..................... 707/104.1 |

FOREIGN PATENT DOCUMENTS

EP          204993         12/1986

OTHER PUBLICATIONS

"New Microsoft Metadirectory Services Ease Deployment", ENT News, down loaded from http://www.entmag.com on Nov. 5, 2001, 1 page.
"Microsoft Metadirectory Services Concepts and Architecture", downloaded from http://www.microsoft.com on Nov. 5, 2001, 34 pages.

* cited by examiner

*Primary Examiner*—Jean M. Corrielus
(74) *Attorney, Agent, or Firm*—Robert H. Frantz; Jeffrey S. LaBaw (57) ABSTRACT

A system and method which propagates change operations to data items within a metadirectory on a differential basis in order to minimize or eliminate redundant updates to attributes within data items that have not changed, as well as conserve computing resources and transmission bandwidth consumed by update activities in large organizations of data items. A best match entry in the metadirectory is selected using a weighted score process, a determination is made as to exactly which attributes are changed by the update operation, and a differential update is propagated throughout the metadirectory via direct joiner access to the data items, or through remote access such as through LDAP.

16 Claims, 9 Drawing Sheets

SYSTEM AND METHOD FOR METADIRECTORY DIFFERENTIAL UPDATES AMONG CONSTITUENT HETEROGENEOUS DATA SOURCES

BACKGROUND OF THE INVENTION

1. Field of the Invention

This invention relates to technologies and methods for synchronizing two or more directories in a computer data storage system, and especially enterprise directory management tools for managing information in numerous databases and directories in an unified manner.

2. Description of the Related Art

Computing enterprises, whether large or small, comprise numerous directories, network operating systems and databases in which corporate data, client information, and employee data is stored.

In some scenarios, the data to be managed is contained in a homogeneous environment, e.g. the forms and formats of the data are similar or compatible. In such a case, a periodic "synchronization" process is executed which compares the contents of the distributed data objects, and selectively copies or updates all data sources to contain appropriate data.

For example, an email server's message storage format is usually the same as the storage formats on the email client machines. So, when a client machine logs into the email server, the server can quickly determine if there are any "new" messages (e.g. messages in the server's storage which have not been copied to the client's storage), and transmit those messages to the client machine.

Larger scale homogeneous database synchronization is enabled by many distributed database products, such as IBM's Lotus Notes [TM] product.

However, many data sources which contain related or partially related data objects are not homogenous with each other, but rather are heterogeneous in nature. For example, information relating to a corporate employee "John Smith" may be contained in many different data stores within a corporate Intranet. His employee records (hire date, pay scale, home address, dependent names, etc.) may be contained in an Oracle database on an Human Resources server, while his current assignment information may be stored in a departmental or divisional server (department, manager's name, email address, etc.) in a Lotus Notes system.

One available technology for managing data objects in heterogeneous data sources is the Lightweight Directory Access Protocol ("LDAP"), and open industry standard for remotely querying and modifying data objects within an LDAP-enabled directory. This protocol reduces query and change operations to a uniform LDAP operation which can be interpreted by the LDAP-enabled servers in order to make changes to data objects in directories.

LDAP enables a user to locate organizations, individuals, and other resources such as files and devices in a network, whether on the public Internet or on a corporate intranet. LDAP is a minimized version of Directory Access Protocol (DAP), which is part of the X.500 standard for directory services in a network.

Some directories, such as LDAP directories, have support for a change log which records the changes that have been made to the directory. For directories which do not support change logs, users or administrators sometimes develop their own mechanisms for detecting changes in a directory. These techniques usually include polling the directory(ies), identifying any changes which have been made since the last poll operation, and upon detection of a change, report that an entry has been modified, usually listing out all the attributes for the changed entry.

In the following example, a phone number in an entry for a person "John Smith" in a Human Resources database at XYZ corporation is to be updated to equal "838-1180", and his department is to be changed to department "6". The original entry with five fields may appear as shown in Table 1.

TABLE 1

Example Original Entry full_name="John Smith"
PhoneNumber="838-1178"
UserID="jsmith"
Division=92
Department=5
email="jsmith@xyzcorp.com"
where the entry is of the format:
full_name,PhoneNumber,UserID,Division,Department,email A user-written script may poll the directory containing the changed entry, which generates a record in the change log. Records in the change log reflect the change to the entry as the series of LDAP modify operations shown in Table 2.

TABLE 2

Example LDAP Change Log

DN:cn=John Smith, ou=Austin,o=xyz
changetype:modify
replace:PhoneNumber
   PhoneNumber:838-1180
-
changetype:modify
replace:UserId
   UserID:jsmith
-
changetype:modify
replace:Division
   Division:92
-
changetype:modify
replace:Department
   Department:6
-
changetype:modify
replace:email
   email:jsmith@xyzcorp.com The typical user-developed scripts do not attempt to identify the actual fields of data which were updated or modified. The resulting update to the other directories in the metadirectory are simply made in their entirety to every data object, including fields which were not actually modified.

If the polling operation is relatively fast compared to a series of single-field modification operations, the user-developed solution will detect each individual change, and update each entry (all fields at once) multiple times throughout the metadirectory.

This often results in many redundant entry updates throughout the metadirectory just to achieve small, incremental changes in the actual data. When realistic organizations of data sources are considered which may comprise hundreds of data sources each with several thousand entries, the system performance impact of these redundant updates is readily apparent.

Besides being an inefficient use of computing resources, this can cause considerable problems in overall system operation, as these updates are propagated over computer networks and consequently consume communications bandwidth and intermediate storage memory unnecessarily.

Another drawback of the LDAP approach is that legacy directories may be in existence indefinitely, and not all legacy directories may be upgraded to LDAP compatibility. Further, LDAP actually only provides a common access protocol (e.g. remote method of accessing the directory), but does not provide in itself actual heterogeneous data source management functions.

While some LDAP replication standards are in works but are as yet unfinished, many existing proprietary approaches are different and incompatible. In any case, replication and synchronization, whether proprietary or standards-based, are insufficient for meeting the needs of enterprise-wide heterogeneous data source directory management.

The term "metadirectory" refers to a class of enterprise directory management tools which provide means to manage and synchronize two or more directories containing heterogeneous data sources. In order to manage disparate heterogeneous data sources, a typical metadirectory product may require the individual data sources (e.g. directories, files, databases, etc.) to export their data to a common format, and then exchange that data with the metadirectory using file transfer, electronic mail, or other data transfer protocol. After the metadirectory receives the files from the data sources, an administrator can add or modify the data from the metadirectory. One such product is the VIA product, originally provided by the Zoomit Corporation, which was acquired by Microsoft Corporation.

Metadirectories are extremely useful for system administration and security management, as they can be used as an integration point to simplify existing solutions and to create new web-based applications. For example, every application has its own proprietary method or scheme of storing information associated with that application, whether it be user information, security information, configuration settings, etc.

Through use of metadirectories, these various data stores may be stored once and integrated so that they may be managed and administered as a single entity (according to the rules and constraints of the metadirectory), thereby reducing the total cost of maintaining this information while increase the security and reliability with which it is handled.

Because current metadirectory products, however, may require the various data sources to be able to export their data into these "common" formats, data sources which do not support such export operations may be excluded from inclusion in a metadirectory.

Another problem in managing entries from multiple heterogeneous data sources according to the present processes is that the information may not have been entered consistently in these data sources, e.g. there may be logical synonyms within the entries that are not exact character-string matches. For example, in three data sources managed within a single metadirectory, each data source containing information for "Robert Smith", the name "Robert Smith" may have been entered as follows:

Robert Smith in data source 1
Bob Smith in data source 2
Rob Smith in data source 3.

Typical metadirectory products provide very little in the way of automatically resolving or detecting these alias or related entries, and often require the administrator to manually intervene to manage these data objects. Traditional approaches to propagating changes to such records containing synonyms would be to propagate a change for each record variant. In this example, to effectively update the mailing address for "Robert Smith" throughout the metadirectory, an administrator would first have to be aware of the three available synonyms, and then manually execute three separate changes which would be propagated throughout the metadirectory.

Therefore, there is a need in the art for a system and method which minimizes the system performance impact of propagating updates to entries in metadirectories. Further, there is a need in the art for this system to cooperate with and extend the capabilities of existing metadirectory tools and technologies, providing user or administrator configurability and control.

BRIEF SUMMARY OF THE INVENTION

The present invention provides as system and method which propagates change operations to data items within a metadirectory on a differential basis in order to minimize or eliminate redundant updates to attributes within data items that have not changed, as well as conserve computing resources and transmission bandwidth consumed by update activities in large organizations of data items. A best match entry in the metadirectory is selected using a weighted score process, a determination is made as to exactly which attributes are changed by the update operation, and a differential update is propagated throughout the metadirectory via direct joiner access to the data items, or through remote access such as through LDAP. In the preferred embodiment, the invention is realized as a plug-in for a metadirectory joiner product, but it may alternately be realized as inline software changes or as a stand alone software product.

BRIEF DESCRIPTION OF THE DRAWINGS

The following detailed description when taken in conjunction with the figures presented herein provide a complete disclosure of the invention.

DETAILED DESCRIPTION OF THE INVENTION

The present invention is preferably realized as an extension to the Tivoli SecureWay [TM] enterprise computing product. However, other suitable methods of realizing the present invention will be readily recognizable by those skilled in the art, such as inline code changes or other techniques typically used to add functionality to other metadirectory management software and products.

One particular advantage of the present invention allows administrators to specify rules for criteria for matching objects from one directory to another, rules for attribute and object ownership, and rules for filtering attributes. For example, a rule may be established for a component in a metadirectory which contains employee salary information to prohibit that information from being replicated or copied into other directories, files or databases.

The metadirectory of the preferred embodiment has the following capabilities which meet the industries expectations of a metadirectory:
 (a) it synchronizes information between one or more connected heterogeneous data source and a metadirectory;
 (b) it is configurable as to which data sources are to be synchronized;
 (c) it is able to flow a pointer such as an LDAP Universal Resource Locator ("IURL") to the information that a metadirectory must resolve for the metadirectory user; and
 (d) it provides a method to replicate data from the multiple heterogeneous data sources according to administrator-defined configuration and rules.

Thus, the metadirectory of the preferred embodiment is an enterprise management tool which integrates multiple different name spaces into a logical single name space, in order to provide a common information model (e.g. schema), consolidated client access to information from all connect directories, and a means for managing the multiple different directories in a unified manner. The metadirectory, however, does not imply physical consolidation of information into a single, master "mega-directory", nor is it just a directory synchronization and replication tool.

Further, the metadirectory of the preferred embodiment interconnects through importing, changing and exporting data to and from heterogeneous data sources including, but not limited to, databases (DB2, Oracle, etc.), Lotus Notes, Novell Directory Services, Netscape, OS/2 directories, Windows NT data sources, etc.

Figure 1:
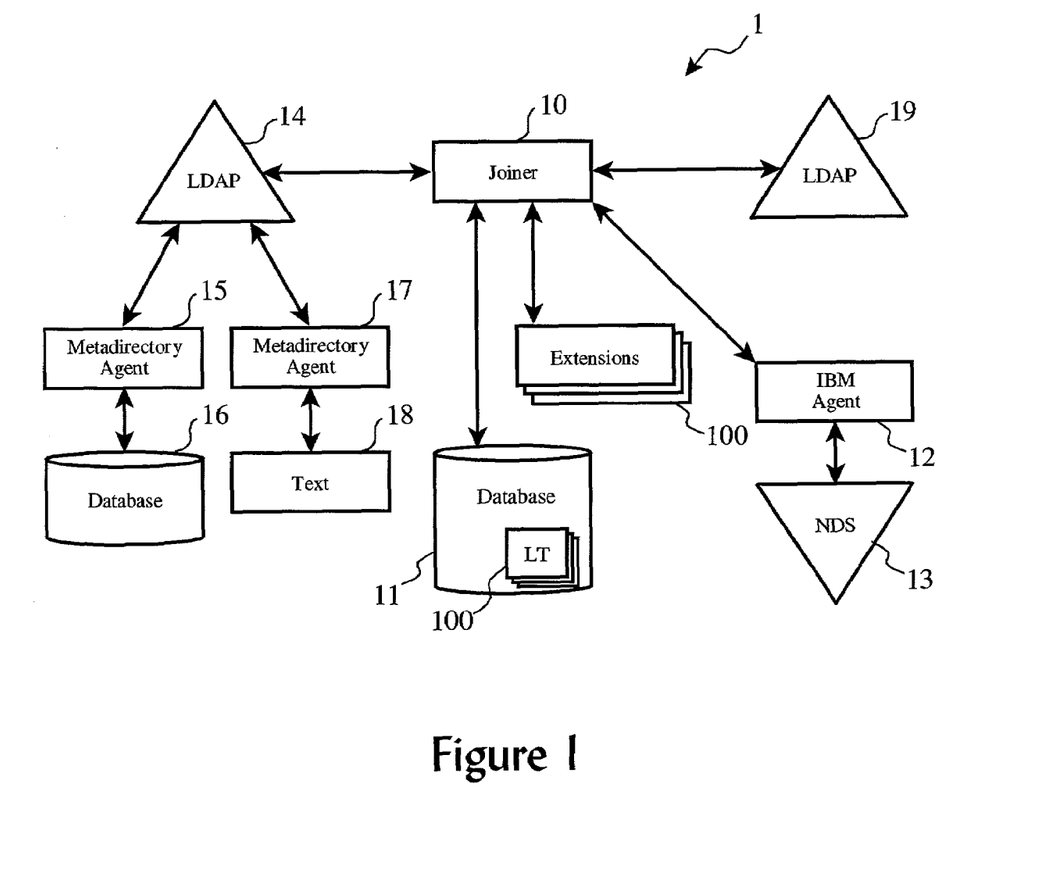
FIG. 1 shows the arrangement of components of metadirectories according to the preferred embodiment.

Turning to FIG. 1, the metadirectory architecture (1) according to the preferred embodiment is shown. The Joiner (10) is a central hub where information is integrated and synchronized, and it is extensible through the use of Java beans (100).

The Joiner (10) communicates with connected data sources ("DS"), such as databases (11, 16), either directly or through an Agent (12, 15, 17). It merges entries of the same object type from different data sources together, such as text files (18), records in a database (16, 11), networked data storage items (13), or other remotely accessible data stores, such as LDAP directories (14, 19). The Joiner (10) keeps a copy of the joined data from each data source in a relational database, preferably in a DB2 database. Each object type for each data store is contained in a local table ("LT") (100).

Each object joined entry for a data store is reflected as a row entry in the corresponding LT. A column is added which contains a unique key or "Match key", which is used to identify the same instance of the object for all the data stores.

Metadirectory agents (17) communicate to the Joiner (10) any changes which are made to a joined object in a directory or data source within the metadirectory. These changes are stored in a change log that is transmitted to the Joiner. The Joiner then evaluates whether these changes are valid, and then propagates them to the other directories within the metadirectory.

As such, the advantages of the Joiner of the preferred embodiment include:
 (a) disparate information sources about a single entity or common subject are grouped into a single entry in the metadirectory through linking information in multiple data into an aggregate;
 (b) all resources in an organization are represented by a Join; and
 (c) rules are administrator-definable to enable a "fuzzy" match between different data sources.

Figure 2:
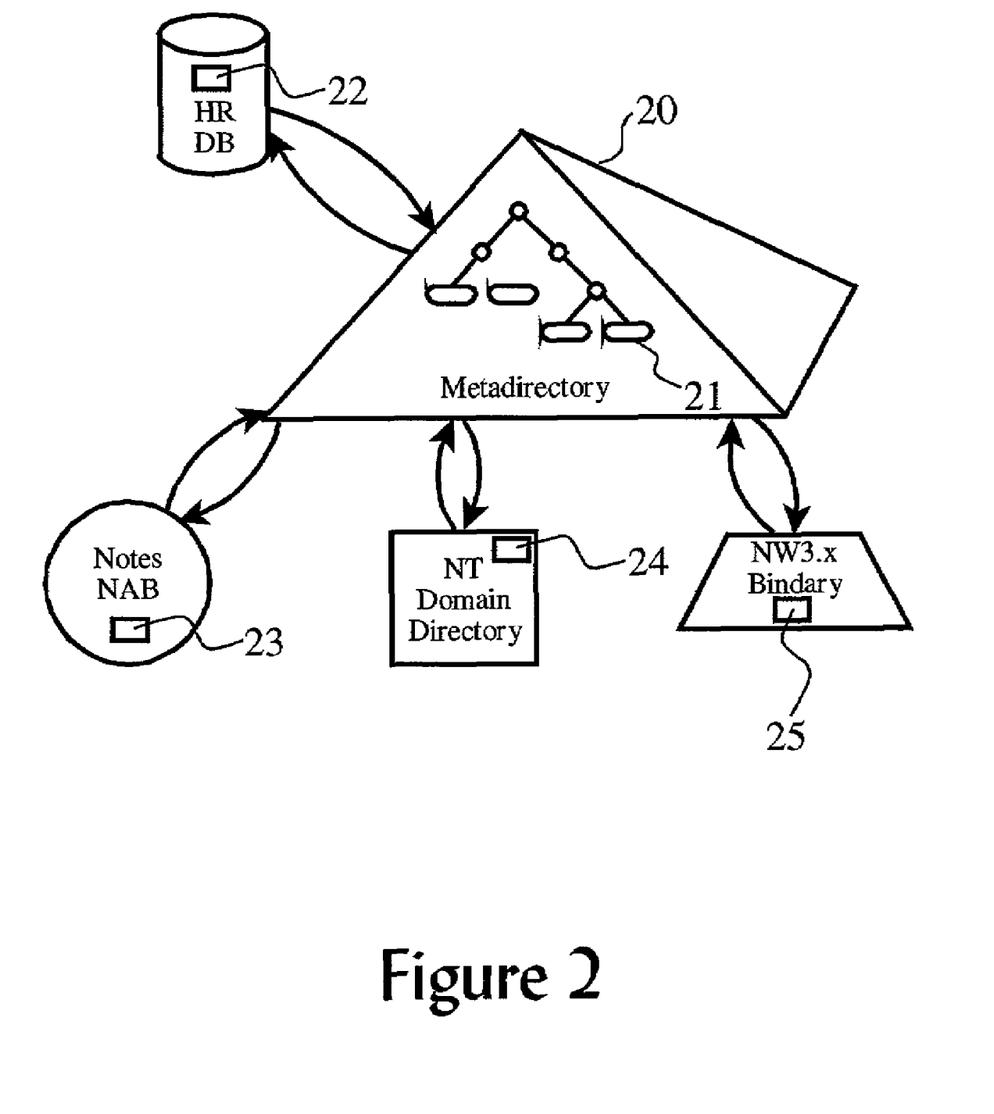
FIG. 2 discloses an exemplary metadirectory for illustrative purposes.

FIG. 2 further illustrates the Join operation using an example. A human resources database may contain a first entry (22) for an employee "Clark Kent", including his employee number, surname, first name, title, work telephone number, department, date of hire, salary, home address, home telephone number, and medical notes. In a Notes Name and Address book ("NAB"), there may be an entry (23) for Mr. Kent containing his user name, user short name, location of his mail server and mail file, and his email address for external email to and from the Internet. In an NT domain directory, there may be an entry (24) for Mr. Kent including a UserID, password, ServerID, and list of groups to which he belongs. Further, in a Novellware bindary, there may be a user object and one or more routing tables (25) defining how to route messages to and from Mr. Kent.

The basic join operation performed by the metadirectory (20) merges selected data items from each of these data sources to create an entry (21) in a local table for Mr. Kent. Objects from data sources which are not merged or joined are filtered. This prevents cluttering the metadirectory with data items which are not commonly needed from the unified view of the metadirectory. For example, the surname, first name, title, work telephone number and department from the HR database may be exported to the metadirectory, filtering out the other attributes (employee number, date of hire, etc.). Additionally, the user objects from the Novellware bindary may be exported to the metadirectory, while filtering out the routing tables for Mr. Kent.

This flexible management control balances the issues of centralized control versus local autonomy depending upon a specific organizations information ownership and security requirements. It allows "tops-down" or "bottoms-up" to accommodate a range of "geopolitical" scenarios. Further, the metadirectory ("MD") may be a master, slave or peer to the managed data sources, which determines which entities may create, modify and delete data objects. Through flexible attribute content control (e.g. filtering configuration), bidirectional flow is defined separate from the object creation, modification and deletion definitions.

Figure 3:
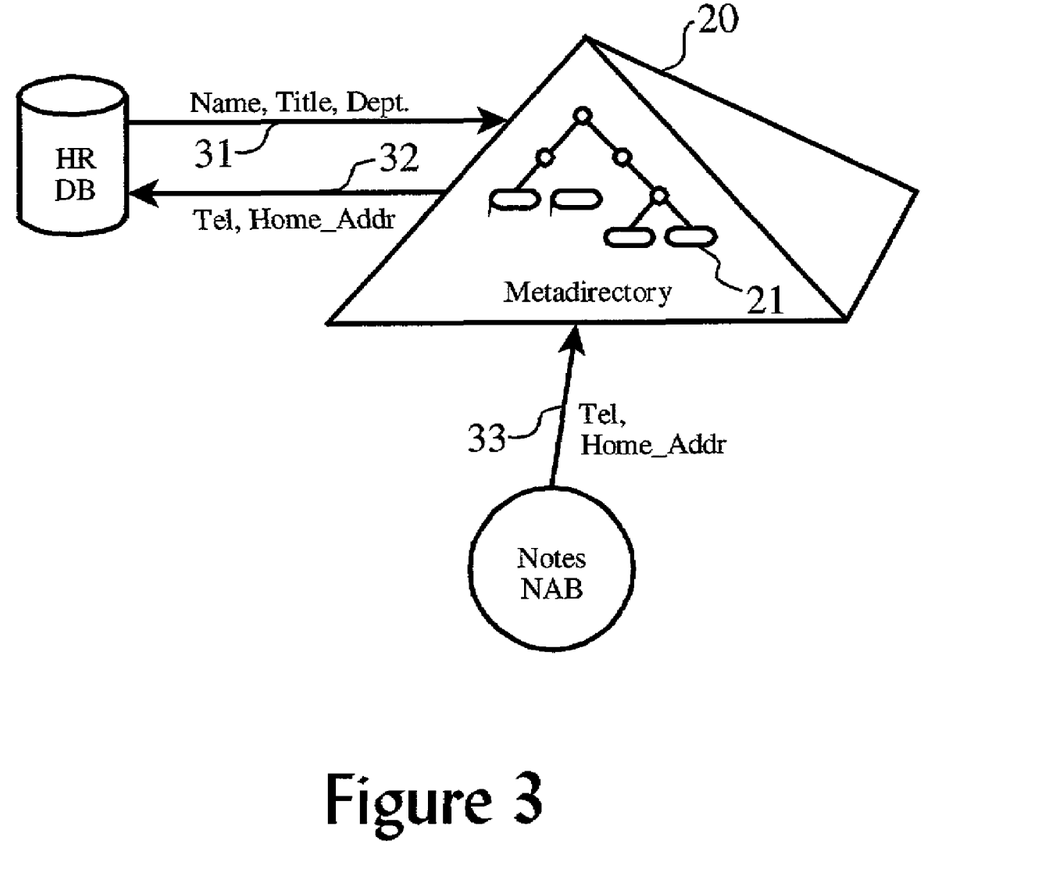
FIG. 3 provides a detailed example of a possible set of attribute names and values merged by a metadirectory.

Continuing with this example for illustration, the human resources ("HR") department may control the creation and deletion of certain attributes (fields) within the HR database, while allowing the metadirectory to create or delete other certain attributes within the HR database. As such, for example in FIG. 3, the HR staff may modify the name, title and department attributes (31) for each employee, while the metadirectory may make changes to the telephone and home address attributes (32), which may be propagated (33) from other department data sources, perhaps the Notes Name and Address Book.

Figure 4:
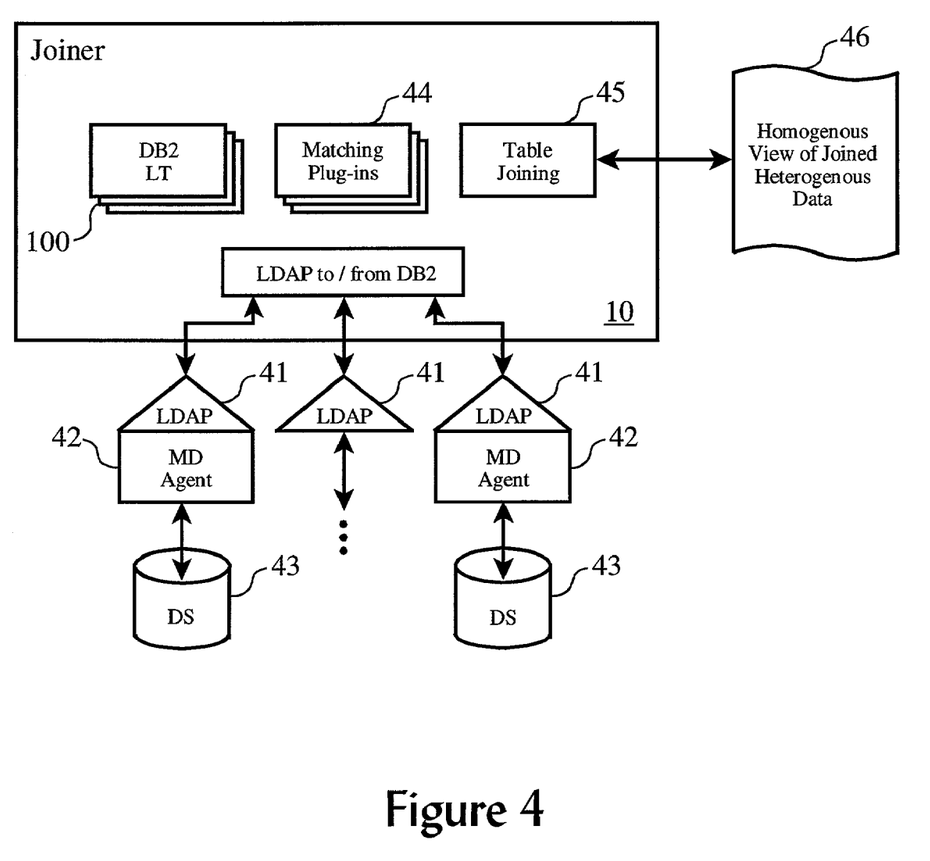
FIG. 4 gives details of the construction of the metadirectory Joiner according to the preferred embodiment.

Turning to FIG. 4, a detailed view of the architecture of the Joiner (10) is provided. The Joiner (10) may receive data object changes from metadirectory agents (42) associated with Data Sources ("DS") (43), preferably in LDAP change operation format. The Joiner (10) may also send changes to the data sources (43). Each MD agent (42) is provided with an appropriate interface, such as an LDAP interface (41).

Within the Joiner (10), a local table (100) associated with each data source (43) is maintained in a common format, preferably in DB2 format, but alternately in any other suitable format. These multiple local tables are then combined to created a joined table ("JT") by a table joining function (45), which provides a homogeneous view (46) of the joined heterogeneous data. The JT data is preferably stored on an LDAP server such that users may view and access the JT data.

In order to properly identify data items which must be changed, responsive to changes received from a data source or an administrator, there are two problems to solve. Each data item consists of an attribute name and attribute value. For example, in an HR database, there may be an attribute (e.g. column) "surname" in each record. For the record (e.g. row) in the HR database for our example Clark Kent, the value of the attribute "surname" may be "Kent".

The first problem with accurate matching involves resolving aliases or synonyms of values of attribute values, within a single data source and between data sources. For example, "Bob", "Robert", and "Rob" may all be synonymous of each other when found in an attribute "First_Name" in the HR database. Standard matching rules, such as "Rob*" where "*" is a "wild card" character or string, would not yield a match for "Bob". A modified matching rule such as "*ob*" would find the alias "Bob", but would also find "Job" in error.

The second problem with accurate matching involves resolving attribute names (not values) between different data sources. For example, an employees first name may be stored in an attribute "First_Name" in an HR database, and again in an attribute "name_1" in a name and address book. Of course, combinations of the two problems can occur, such as First Name = "Robert"
and
name_1 = "Bob".

As previously discussed, many metadirectory products do not attempt to resolve these synonyms and matching problems automatically, but provide an administrator tool to make the matches manually. However, the present invention provides for the addition of matching and joining logic, rules and relationships through the use of matching plug-ins (44), preferably in the form of Java beans and extensible markup language ("XML"). Using these matching definitions and logic, the attribute naming conventions local to the individual data sources may be maintained, and master, slave and peer roles can be customized.

Figure 5:
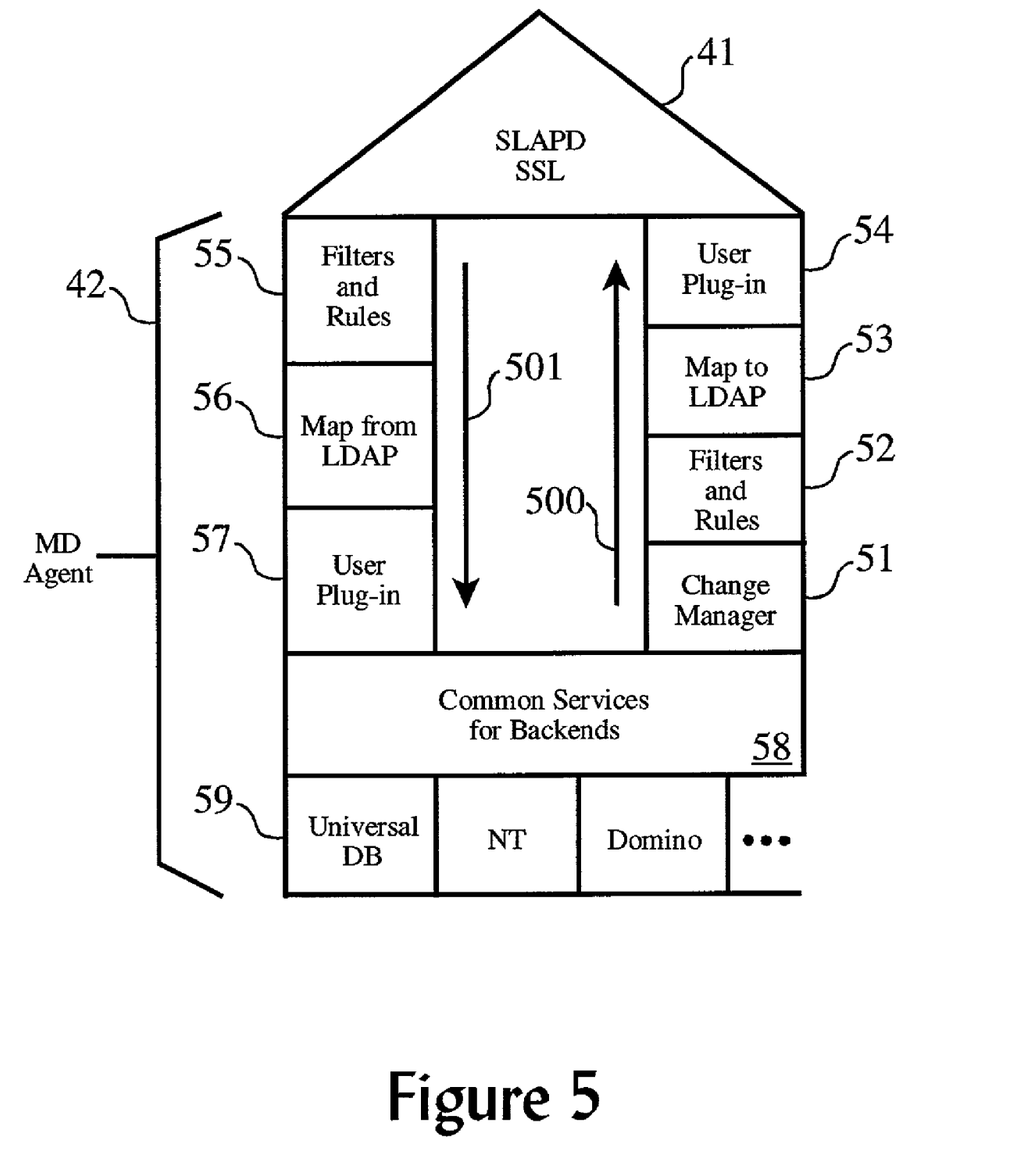
FIG. 5 provides details of the components of a metadirectory agent according to the preferred embodiment.

Turning to FIG. 5, more detail of the directory-agnostic metadirectory agent (42) is shown, which is configurable using any appropriate object-oriented programming technology, such as PERL, Java, Visual Basic, or Python. It is a bi-directional stack of services, with data source specific interfaces (59) to a common services (58) function. Changes which are being reported from the data source to the metadirectory (500), are first converted from the data source specific protocol by a DS interface (59) to an internal common format, handled by the common services (58), and received by a change manager (51).

The change manager keeps track of changes and logs them to a change log. The filters and rules (52) allow for a definition of what is to be exported to the metadirectory and what is to be blocked from export. Then, the changes are mapped from the local set of attribute names to the metadirectory attribute names and put into LDAP protocol format, preferably using XML-based schema mapping.

According to the preferred embodiment, a last stage of processing for user customization (54) is provided, prior to submitting the change to a simple LDAP demon ("SLAPD") (41) which communicates the change to the metadirectory, preferably using secure sockets protocol ("SSL").

Changes being propagated from the metadirectory to the data source are received (501) by the metadirectory agent (42) from the SLAPD (41). The filters and rules (55) are applied to insure that only items allowed to be changed by the metadirectory are implemented. Then, the change operation is mapped from the LDAP protocol to the common services format, after which it is handled by the common services (58) and passed to the data source specific interface (59). The DS interface (59) then converts it from the common services format to a command (or set of commands) directly compatible with the specific data source.

The change manager is preferably application assisted to approximate real-time response to changes in the data source, and employs a plug-in architecture for associated triggers. The change logging can be periodic (or polled), or may be driven by events or changes. In it's simplest form, the change log is a text-based file.

Figure 6:
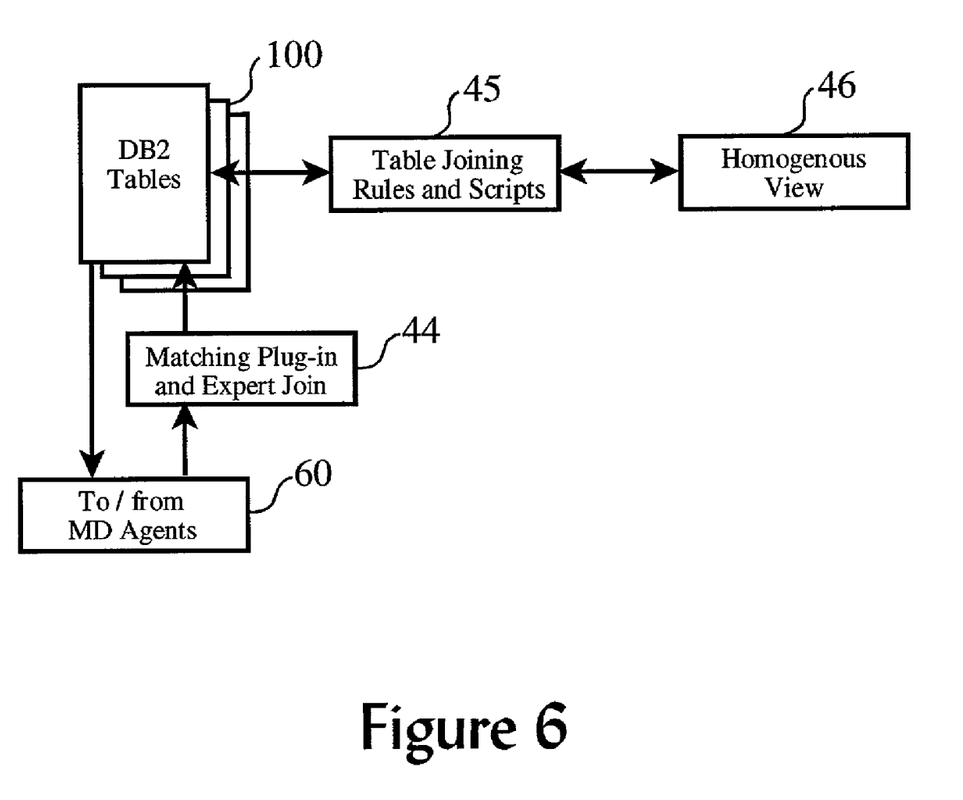
FIG. 6 shows the functional flow of the process of the invention in general.

In FIG. 6, a functional arrangement between the DB2 tables (100), the matching plug-in and expert joiner (44), table joining functions (45) and the homogenous joined table (46) is presented. Changes from the MD agents (from the data sources) is processed by the matching plug-in (44) to be stored in the tables (100) associated with the data source from which the change came. Then, the multiple tables (100) are joined by the joining logic (45) to create the JT homogenous view (46), as previously described. Changes which originate from the administrator via the homogenous view (e.g. via a Java-based user interface tool) are implemented into the data source tables (100), and then propagated out to the MD agents as described earlier.

Turning now the matching logic, as previously discussed, there are two problems to solve to effectively match and change entries in heterogeneous data sources—namely attribute name synonyms and attribute value synonyms. According to the preferred embodiment, the following components and logical processes are realized as a Java bean extension(s) to a metadirectory Joiner function, such as the Joiner as previously described or an alternate Joiner function. It will be readily apparent to those skilled in the art that alternate means of realization are available, such as inline code changes or stand-alone application program implementation, without departing from the spirit and scope of the present invention.

Reviewing our example and illustration of the problems to be solved by a successful matching system, synonyms may be defined for the first name (e.g. given name), home telephone number, work telephone number and title for each data source in a match table.

The matcher plug-in of the preferred embodiment uses a single match table for all the joined object classes. However, also according to our preferred embodiment, a match table name is specified with every joined object class for potentially implementing a plurality of match tables. So, in the current embodiment, all the match table names for all the object classes are specified as the same name. An example match table is shown in Table 3 in which synonyms for a name and address book (NAB) and a human resources database are defined, both in the attribute names and in the attribute values.

TABLE 3

Example Match Table

| Rule | Attribute Name Synonyms | Attribute Value Synonyms |
| --- | --- | --- |
| 1 | HR: First_name<br>NAB: name1 | Rob*, Bob;<br>Daniel, Danny, Dan;<br>Liz, Elizabeth; |
| 2 | HR: Home_tel<br>NAB: tele1 | 512-111-4321, 111–4321;<br>512-xxx-yyyy, xxx-yyyy; |
| 3 | HR: Work_tel<br>NAB: tele2 | 512-999-8888, X8888, ext.8888;<br>512-xxx-yyyy, Xyyyy, ext.yyyy; |
| 4 | HR: Title<br>NAB: position | supervisor, "group supervisor" |

Figure 8:
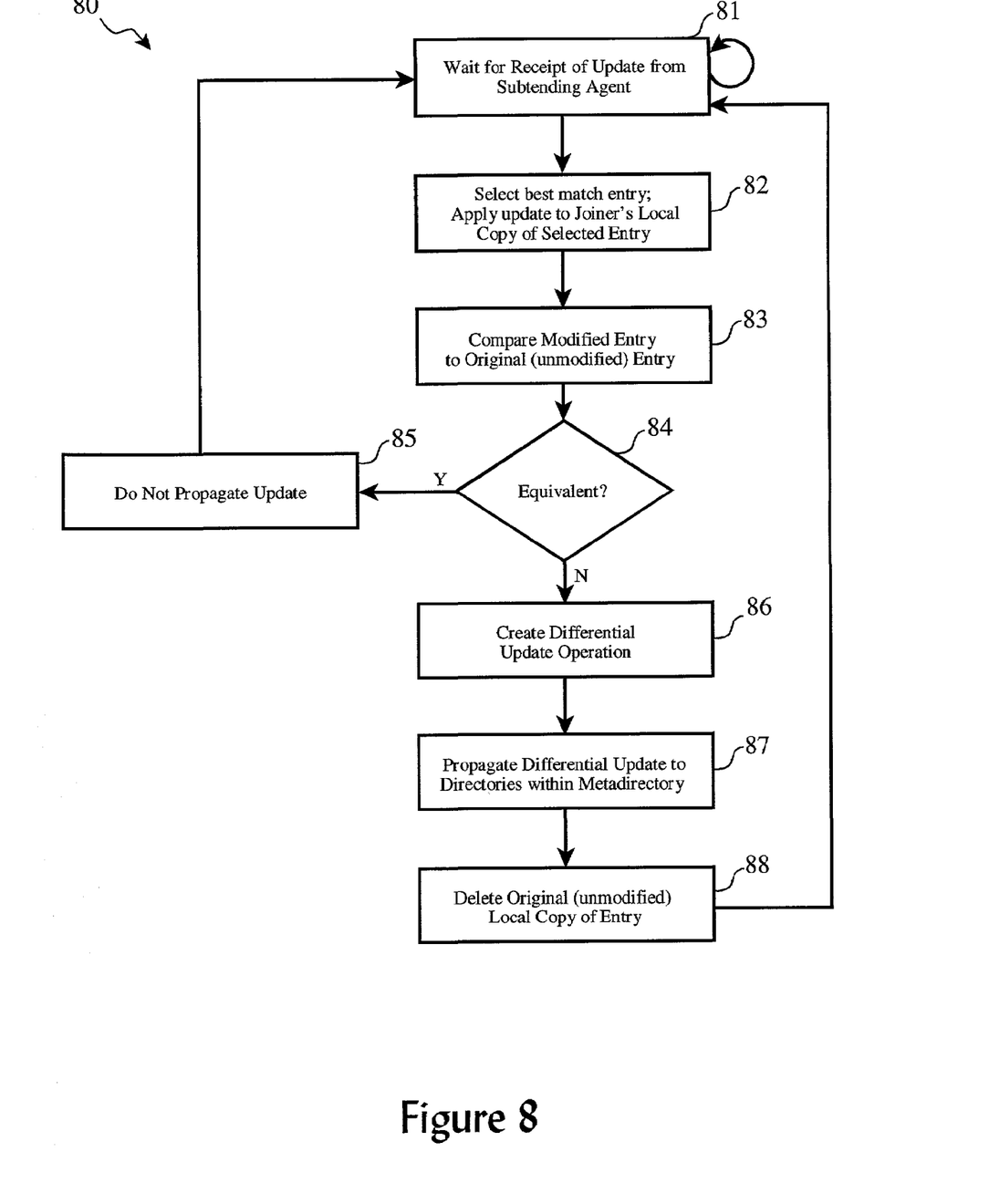
FIG. 8 sets forth the high-level logical process of the invention.

FIG. 8 shows the high-level logical process (80) according to the invention. As previously discussed, the Joiner normally stores local copies of entries from the directories being managed by the metadirectory. When the Joiner receives an update operation (81) for an entry in a directory, it performs an "apply" operation (82) on a selected entry in the metadirectory local table, creating a temporary modified entry containing the result of the update.

This temporary modified entry is not written to the secondary storage (e.g. propagated to the other joined directories), however. The modified entry is compared (83) with the original (unmodified) entry to identify the differences between the original entry and the updated entry.

If there are no differences between the original entry and the updated entry (84), no updates are propagated to other directories in the metadirectory, and the temporary local entry is deleted.

If there are differences (84), then a differential update operation is created (86) containing only the changed fields in the entry and omitted the operations which result in no net change to a field. This differential update is then propagated (87) to the other directories in the metadirectory, and the original (unmodified) local copy of the entry is replaced by the temporary (updated) copy of the entry. As each of the content formats of the joined objects and directories of the metadirectory may be in different formats (e.g. NAB, DB2, etc.), in order to implement the differential change to the affected items, different update operations must be executed for different format objects and directories. The differential update is propagated in a common format, preferably LDAP, and converted to the necessary format of each joined object and directory by the metadirectory agents.

In the preferred embodiment, an entry class is implemented to store the distinguished name and all the attributes that make the entry. These attributes are sorted in alphabetical order by attribute name. As a result, the "apply" operation which applies the updates sent in from a directory to the Joiner is extremely efficient.

The "difference" operation, consequently, contains the minimal set of update or change operations that need to be applied to transform the original entry to the new entry, which increases time responsiveness and bandwidth consumption efficiency in the metadirectory.

Further according to the preferred embodiment, the application programming interface ("API") is mapped to the LDAP API. So, a metadirectory agent that is responsible for propagating changes made in a directory to the Joiner records the changes as LDAP operations, such as LDAP "add", "delete" or "modify".

The following example illustrates the operation of the invention, wherein a phone number in an entry for a person "John Smith" in a Human Resources database at XYZ corporation is to be updated to 838-1180, and his department is to be changed to department 6. The original entry with five fields may appear as shown previously in Table 1. Records in the change log created by the metadirectory agent that reflect the change to the entry as the LDAP modify operation were shown in Table 2.

When the change is sent to the Joiner by the metadirectory agent, the Joiner applies the changes to the original entry that it has stored locally to create a new (temporary) entry. After determining the difference between the old entry and the new entry, the Joiner creates a differential update LDAP operation as shown in Table 4.

TABLE 4

Differential Update LDAP Operation

DN:cn=John Smith, ou=Austin, o=xyz,
changetype:modify
replace:PhoneNumber
   PhoneNumber:838-1180
-
changetype:modify
replace:Department
   Department:6

This differential update operation is then propagated by the Joiner to the other directories within the metadirectory. It is readily apparent from this simple example that the propagation bandwidth is reduced, and the update processing requirements are reduced by this differential update technique. In practice, most entries have many more than 5 fields, and updates may occur to many entries in a given time period, which multiplies the advantage of the invention.

According to the preferred embodiment of the invention, the step of selecting a local table entry upon which to apply the update operation for comparison purposes first employs a user-configurable synonym dictionary, including match tables, to allow for the reduction of multiple operations to records containing synonyms in keys or fields and to assist in the selection of one best matching entry from multiple matching entries.

This matching logic, which consults the synonym dictionary or "match table(s)", is preferably executed before examining the changes in a change log for a data source to reduce it to a minimal set of changes.

Figure 7:
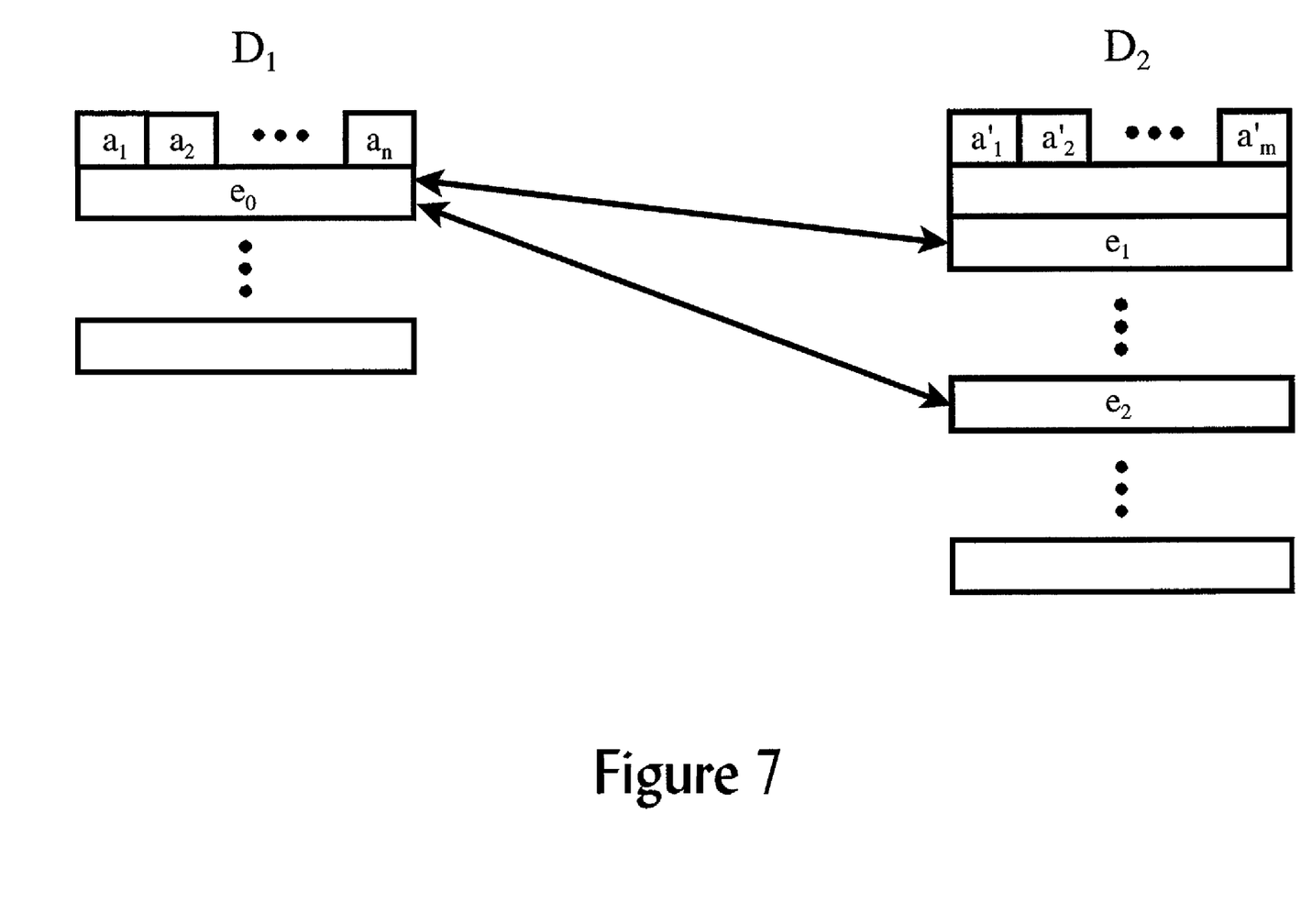
FIG. 7 provides an example of a multiple-entry match for illustrative purposes.

For illustrative purposes, FIG. 7 provides some example entries in two data sources, $D_1$ and $D_2$. We can suppose for this example that data source $D_1$ is the metadirectory copy of the entry to be matched, and the second data source $D_2$ is the data source to be searched for matching entries. Further, there are several attributes, $a_1$ through $a_n$, in data source $D_1$, which are mapped to attributes $a_1'$ through $a_m'$ in data source $D_2$. Perhaps, at may be "First_name" in data source $D_1$ which is mapped to "name1", or $a_1'$, in data source $D_2$. Further for this illustration, suppose that entry $e_0$ is the entry or record (e.g. set of attribute values) to be matched in $D_2$, and that records $e_1$ and $e_2$ of $D_2$ both match attribute $a_1$ in $e_0$, such as:

$e_0(a_1)$="Kris";
$e_1(a_1')$="Chris"; and
$e_2(a_1')$="Krishna";
all of which are defined as attribute value synonyms.

In most situations, it is unlikely that data source $D_2$ actually contains two records for the same person "Kris", so this match is not completely resolved based on the typical fundamental rules of matching. Most metadirectory products would simply record this match discrepancy and report it to an administrator for the administrator to resolve manually.

However, the matching process of the invention eliminates much of this incapability to resolve a match by providing a weighted matching approach in which multiple attributes can be matched to determine a more likely match. For example, further assume that attribute $a_5$ of data source $D_1$ is "Title", and that $a_5'$ of data source $D_2$ is "Position". So, the two attributes can be mapped to each other, and a weight can be assigned to the match between those attributes. Assuming a weight of 0.9 to "First_name" and 0.6 to "Title", and the following example records $e_0(a_1, \ldots, a_5)$=("Kris", . . . , "Manager");
$e_1(a_1', \ldots, a_5')$=("Chris", . . . , "Contractor"); and
$e_2(a_1', \ldots, a_5')$=("Krishna", . . . , "Supervisor");

and assuming that "Manager" and "Supervisor" are defined as synonyms, a combined "score" or weight can be assigned between $e_0$ and $e_1$ of 0.9 (matches in First_name only), and between $e_0$ and $e_2$ of 1.5 (matches in both First_name and Title). This process can be normalized, if desired, by dividing the score by the number of attributes mapped and compared (such as dividing by 2 in this example), and a threshold may be set which, if exceeded, is indicative of a match. This process can be extended to include any number of attributes in the comparison with each attribute with a specific weight assignment.

Figure 9:
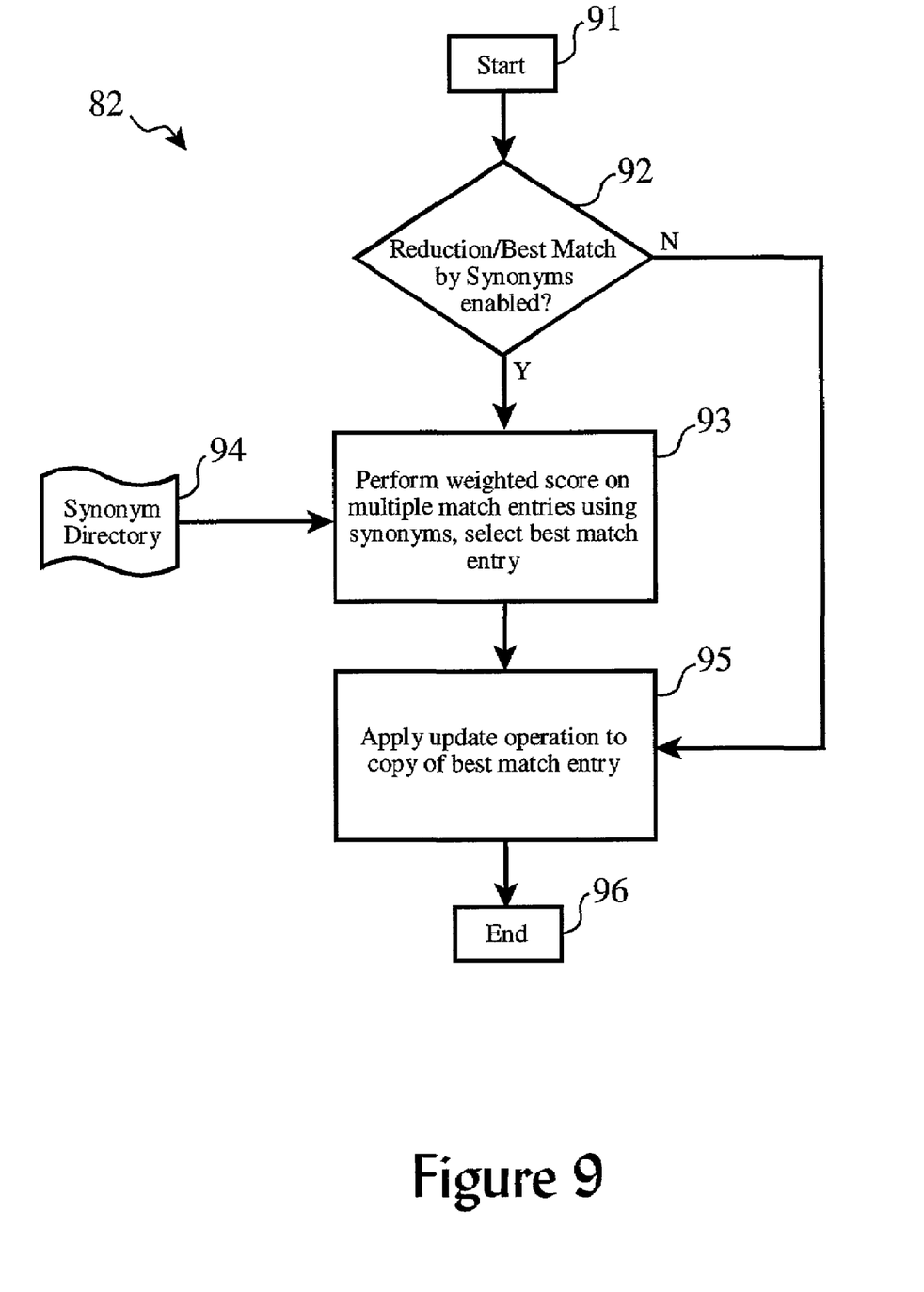
FIG. 9 shows detail of the logical process of the preferred embodiment for generating performing a weighted score on multiple entry matches.

Turning to FIG. 9, the logical process (82) of the preferred embodiment to apply the weighted score to multiple-match entries is shown in more detail. When the process is started (91), a check is made to see if reduction and matching by synonyms is enabled (92), and if so, the weighted scoring as previously described is performed (93) using the administrator-configurable synonym dictionary (94) for all entries which match values in mapped attributes such that only the one best matching entry is selected.

Now that a single, best match entry is selected, the change or update is applied (95) to a temporary copy of the selected entry.

Processing proceeds as shown in FIG. 8 by comparing (83) the updated entry is the original (unmodified) selected entry. Then, if there is a net change to the entry due to the update (e.g. the temporary copy is not equivalent to the original copy), processing continues to generate (86) a differential update operation and to propagate (87) that operation to other directories within the metadirectory.

Optionally, multiple entries in a directory which refer to the same entity because the fields or keys in these entries are synonymous can be flagged or marked. This may allow an administrator to review the marked entries, select a single entry that best represents the synonymous entity, and delete the other entries in the directory. This reduces the number of entries that need to be administered in a directory and the number of change log entries that are generated.

It will be understood from the foregoing description that various modifications and changes may be made in the preferred embodiment of the present invention without departing from its true spirit, such as the use of alternate programming methodologies or languages, and use or compliance with other remote directory management protocols. It is intended that this description is for purposes of illustration only and should not be construed in a limiting sense. The scope of this invention should be limited only by the language of the following claims.

What is claimed is:

1. A computer implemented method for synchronization and propagation of metadirectory updates, said metadirectory comprising a plurality of joined heterogeneous data sources, said data sources comprising one or more entries having one or more attributes, said method comprising the steps of:

receiving by a joiner plug-in a first update operation for a first entry in a first data source;

selecting by said joiner plug-in a best match entry of said metadirectory to said first entry in the first data source;

applying by said joiner plug-in said update operation to a local temporary copy of said best matching metadirectory entry;

comparing by said joiner plug-in said updated local temporary copy to an original unmodified entry in said metadirectory;

responsive to said step of comparing finding that one or more differences occurred due to the application of said update operation, creating by said joiner plug-in a differential update command containing only changed fields in said updated temporary copy, thereby omitting operations resulting in no net change to said updated temporary copy; and propagating by said joiner plug-in said differential update command to at least one other joined data source to implement said first update operation.

2. The method as set forth in claim 1 wherein said step of receiving a first update operation comprises receiving an LDAP change operation.

3. The method as set forth in claim 1 wherein said step of selecting a best match entry of said metadirectory comprises the step of consulting a synonym list to resolve multiple matches.

4. The method as set forth in claim 1 wherein said step of selecting a best match entry of said metadirectory comprises the step of performing a weighted scoring analysis across two or more attributes.

5. The method as set forth in claim 1 wherein said step of propagating a differential update command comprises the step of transmitting an LDAP change operation.

6. A computer readable medium encoded with software coupled to a computer system for synchronization and propagation of metadirectory updates, said metadirectory comprising a plurality of joined heterogeneous data sources, said data sources comprising one or more entries having one or more attributes, said software causing one or more processors to perform the steps of:

receiving by a joiner plug-in a first update operation for a first entry in a first data source;

selecting by said joiner plug-in a best match entry of said metadirectory to said first entry in the first data source;

applying by said joiner plug-in said update operation to a local temporary copy of said best matching metadirectory entry;

comparing by said joiner plug-in said updated local temporary copy to an original unmodified entry in said metadirectory;

responsive to said step of comparing finding that one or more differences occurred due to the application of said update operation, creating by said joiner plug-in a differential update command containing only changed fields in said updated temporary copy, thereby omitting operations resulting in no net change to said updated temporary copy; and propagating by said joiner plug-in said differential update command to at least one other joined data source to implement said first update operation.

7. The computer readable medium as set forth in claim 6 wherein said software for receiving a first update operation comprises software for receiving an LDAP change operation.

8. The computer readable medium as set forth in claim 6 wherein said software for selecting a best match entry of said metadirectory comprises software for consulting a synonym list to resolve multiple matches.

9. The computer readable medium as set forth in claim 6 wherein said software for selecting a best match entry of said metadirectory comprises software for the step of performing a weighted scoring analysis across two or more attributes.

10. The computer readable medium as set forth in claim 6 wherein said software for propagating a differential update command comprises software for transmitting an LDAP change operation.

11. A computer system for synchronization and propagation of metadirectory updates, said metadirectory comprising a plurality of joined heterogeneous data sources, said data sources comprising one or more entries having one or more attributes, said system comprising:
- an update operation receiver disposed in a joiner plug-in adapted to receive a first metadirectory update operation for a first entry in a first data source;
- a matcher disposed in said joiner plug-in adapted to select a best match entry of said metadirectory to said first entry in the first data source;
- a comparitor disposed in said joiner plug-in adapted to apply said first update operation to a local temporary copy of said best matching metadirectory entry, and to detect differences between said updated local temporary copy to an original unmodified entry in said metadirectory;
- a differential update command creator adapted to create a second metadirectory update command responsive to identification of one or more differences detectted by said comparitor, said differential update command containing only update command pertaining to changed fields in said updated temporary copy, thereby omitting operations resulting in no net change to said updated temporary copy;
- an update propagator disposed in said joiner plug-in adapted to propagate said differential update command to at least one other joined data source to implement said first update operation.

12. The system as set forth in claim 11 wherein said update operation receiver is adapted to receive an LDAP change operation.

13. The system as set forth in claim 11 wherein said matcher is adapted to consult a synonym list to resolve multiple matches.

14. The system as set forth in claim 11 wherein said matcher is adapted to perform a weighted scoring analysis across two or more attributes.

15. The system as set forth in claim 11 wherein said update propagator is adapted to transmit an LDAP change operation.

16. A computer implemented method comprising the steps of:
- receiving by a joiner plug-in a first metadirectory update operation for a first entry in a first data source, said metadirectory comprising a plurality of joined heterogeneous data sources, said data sources comprising one or more entries having one or more attributes;
- selecting by said joiner plug-in a best match entry of said metadirectory to said first entry in the first data source;
- applying by said joiner plug-in said update operation to a local temporary copy of said best matching metadirectory entry;
- suppressing propagation by said joiner plug-in of said updated temporary copy of said metadirectory entry to other joined datasources within a metadirectory;
- comparing by said joiner plug-in said updated local temporary copy to an original unmodified entry in said metadirectory;
- identifying by said joiner plug-in one or more differences resulting from said step of comparing;
- responsive to identifying no differences, deleting by said joiner plug-in said updated temporary copy;
- responsive to identifying one or more differences, creating by said joiner plug-in a differential update command containing only changed fields in said updated temporary copy, thereby omitting operations resulting in no net change to said updated temporary copy; and
- propagating by said joiner plug-in said differential update command to at least one other joined data source to implement said first update operation.

* * * * *